(12) United States Patent
Hull

(10) Patent No.: US 6,506,273 B1
(45) Date of Patent: Jan. 14, 2003

(54) TIRE SEALANT SYSTEM

(76) Inventor: Jack L. Hull, 5540 W. 5th St., #171, Oxnard Shores, CA (US) 93035

( * ) Notice: Subject to any disclaimer, the term of this patent is extended or adjusted under 35 U.S.C. 154(b) by 129 days.

(21) Appl. No.: 09/643,179

(22) Filed: Aug. 21, 2000

Related U.S. Application Data

(60) Provisional application No. 60/150,168, filed on Aug. 21, 1999.

(51) Int. Cl.$^7$ ............................................. B29C 73/16
(52) U.S. Cl. ..................... 156/115; 152/502; 152/504; 156/97
(58) Field of Search ..................... 156/115, 97, 110.1, 156/155; 152/504, 502, 450; 510/296; 206/524.7

(56) References Cited

U.S. PATENT DOCUMENTS

| | | | | |
|---|---|---|---|---|
| 4,388,261 A | * | 6/1983 | Codispoti et al. ........... | 156/115 |
| 5,364,463 A | * | 11/1994 | Hull ........................... | 152/504 |
| 5,429,230 A | * | 7/1995 | Hodakowski et al. ..... | 206/524.7 |
| 5,827,586 A | * | 10/1998 | Yamashita et al. ........ | 206/524.7 |

* cited by examiner

Primary Examiner—Geoffrey L. Knable
(74) Attorney, Agent, or Firm—Kenneth J. Hovet

(57) ABSTRACT

A tire sealant system in accordance with the present invention includes a tire sealant powder, a water-soluble bag which hermetically encloses the powder and a predetermined volume of water corresponding to the amount of enclosed powder. The powder comprises a plurality of heavy metal inorganic salts, a plurality of crystalline silicate clays and a plurality of mica particles. The water-soluble bag is made a polyvinyl alcohol (PVOH) polymer. For deployment in the repair of a puncture in a tire, a tire bead is separated from the wheel rim. This establishes a gap between the bead and the rim, and the water-soluble bag (and enclosed sealant powder) is inserted through the gap and placed in the tire well. Next, the predetermined volume of water is poured through the gap into the tire well. The bead is remounted to the rim, and the tire is inflated. The bag dissolves in the water, and the powder contacts the bag to form an aqueous suspension. The particles from the suspension deposit in the puncture and seal the puncture.

17 Claims, 2 Drawing Sheets

TIRE SEALANT SYSTEM

This application claims priority from provisional patent application Ser. No. 60/150,168 which was filed Aug. 21, 1999.

FIELD OF THE INVENTION

The tire sealant system of the present invention is particularly, but not exclusively, useful as a device and method for repairing a puncture in a tire. The water soluble bag delivery system allows application of a various compositions of dry materials and liquids to be applied to tires, thereby providing puncture protection. After placement of the bag into the tire cavity, water, a water/propylene glycol combination or other liquids may be added to produce the sealant solution. This type of delivery system is previously unknown to the tire industry, tire sealant industry, or heavy equipment industry. Allowing the use of varying amounts of freeze protection as needed by local climate extremes results in a lower application cost and extended storage life of the sealant composition. A dry material powder may be shipped without a large volume of water and antifreeze, eliminating hazards of spillage of sealant solution while reducing shipment gross weight by 200 to 500%.

BACKGROUND OF THE INVENTION

Previous methods of applying sealant protection required various expensive pump mechanisms to place the sealant solutions in the tire cavity. The most common installation method requires high viscosity solutions be pumped with a hand pump through the tire stem assembly. The core assembly must be removed from the stem assembly prior to the pumping procedure, and then thick sealant solution is pumped via a laborious pumping procedure through the stem orifice. These hand pumps, over time, often rust or become inoperable, adding to the cost of treatment and deterring customers from considering treatment to their tires. After treatment of the tires, sealant solutions often plug the valve core assembly making it difficult to remove air from the tire when major repair or replacement is required.

Distributors and users of sealant solutions are plagued with numerous issues causing industry sales and applications to be limited in comparison to market place potential. Manufacturers of sealant solutions must ship heavy 5-gallon pails (50 to 75 lbs) of solution across the country, often at premium rates because they are transporting deleterious chemicals. Sealant solutions are often stored in user stock rooms or on distributor shelves for prolonged periods of time, making them ineffective or unusable while consuming large storage space. These 5-gallon pails and associated lids are expensive and seldom recycled.

Sealant manufacturers ship solutions from their factory with freeze protection included for maximum temperature extremes (usually –50° F.). This means two thirds of the liquid is glycol for maximum freeze protection, regardless of local temperatures where the sealant solution is actually used. For most manufacturers, the cost of glycol is the single highest cost factor in producing tire sealant solution.

A serious added expense for the user of sealant solution lies in the purchase of more sealant than is actually needed for the application. Minimum purchase for most applications is 5 gallons of sealant, yet many tires require only 1 quart to one-half gallon. Therefore, users are often left with several gallons of solution to be stored for later use. This often results in the user electing not to treat tires with sealant, or deciding have a tire supplier apply sealant resulting in greater end-user cost. To provide the user with sealant protection, the tire dealer may buy a 55-gallon drum instead of a 5-gallon pail requiring a major inventory investment and shipment of a heavy drum from the sealant manufacturer. Sealant solutions often sit for extended periods of time in storage and dry up. These associated costs and inefficiencies have severely limited the appeal of tire sealant to users and distributors, especially because these sealant solutions only protect ¼ inch punctures in the tire tread.

Puncture protection of ¼ inch or less requires that larger punctures must be repaired. Tire repair is made significantly more complicated with the presence of high-viscosity glue like solutions. High viscosity glue sealant solutions require accurate measurement of solution to be properly applied to tires (especially below 11-inch rim diameter). Service personnel often add extra solution to make certain of adequate protection. This increases treatment cost in both time and materials. Pumping of liquids from a closed pail with a hand pump into the closed cavity of the fire requires a certain amount of guesswork on the part of the person applying the sealant liquid. When larger tires are treated, the hand pump approach is so time consuming that service personnel would rather pour sealant solution directly out of 5-gallon pails into the tire prior to completion of mounting the tire on the wheel. This process is wasteful and inaccurate, yet it is the only practical way to apply large amounts of high-viscosity liquids.

Some other higher density sealant solutions required a high shear mixing apparatus to congeal or manufacture the finished liquid in the field or shop. This mixing procedure is often cumbersome and susceptible to spills that could create additional work by mixing personnel. Mixing a solution in this fashion occasionally allows dust particles of the constituents to become airborne and potentially ingested by mixing personnel. Chemical dust from inefficient mixing is also deposited on surrounding surfaces, requiring clean up after the mixing project is completed.

In light of the above, it is an object of the present invention to provide a tire sealant system-and method of application therefor which obviates the need for a hand pump when using the system to seal and/or repair a tire. It is another object of the present invention to provide a tire sealant system and application method which can seal and/or a repair tire puncture without removal of the tire stem. It is another object of the present invention to provide an application method for the tire sealant system which is quickly and easily accomplished with a minimum of waste. Another object of the present invention is to provide a tire sealant system that is relatively easy to manufacture in a cost effective manner.

SUMMARY OF THE INVENTION

A tire sealant system in accordance with the present invention includes a tire sealant powder, a water soluble bag and a predetermined volume of water. The powder includes a plurality of heavy metal inorganic salt particles, a plurality of silicate clay particles, a plurality of mica particles and a thickening agent.

The powder is hermetically sealed within the bag until deployment. For deployment, the bag is placed within a tire well, and a predetermined volume of water corresponding to the amount of powder within the bag is poured into the well. The water soluble bag dissolves in the water. As the bag dissolves, the enclosed powder contacts the water and dissolves therein, forming an aqueous suspension. The tire is then mounted to a wheel rim and is inflated. The above-listed particles in the suspension seal any subsequent punctures in the mounted tire.

The device and method of the present invention is also used to repair punctures in tires which have already been mounted to a wheel rim. To do this, a bead of the tire is dislodged from the rim. The bag and water are placed in the tire well to form the aqueous suspension as described above. Next, the bead is remounted on the rim and the tire is inflated. As the tire is inflated, the particles deposit in the puncture and seal the puncture.

This invention provides a revolutionary delivery system by effectively delivering and dispensing various tire treatments. Performance of a sealant solution is enhanced by use of a revolutionary delivery system that incorporates a water-soluble bag polyvinyl alcohol (PVOH) bag as a means to locate sealant constituents in the tire cavity. The PVOH bag dissolves almost instantly (within 2 minutes) in the tire when water and, or, water and antifreeze is added, yielding a homogeneous sealant solution.

This delivery system accomplishes several functions:
1. Eliminates spill conditions normally encountered with sealant solutions.
2. Allows larger particles to be used in the formulation that previously plugged the tire stem when pumped through the stem assembly. This invention utilizes larger particles improving sealant protection as these larger particles bridge larger punctures in the fire. Management of fluid-loss both in the tire and in application to the tire results in a more-effective and less costly tire puncture protection while sealing bigger punctures with greater reliability than previous tire sealants. Once the PVOH bag and a measurable amount of liquid are added directly into the tire cavity, the tire does the mixing as it rotates.
3. The proper amounts of dry material and, or, liquids can be easily applied giving the user the option to add water and or freeze protection specific for local climate extremes. Specific incremental adjustments in dry material can be applied for every specific tire size offering minimal cost to the user. Application methods of this invention are more reliable and cost effective because the water-soluble bag provides a means to apply precise amounts dry materials and liquids at the distributor location or user facility. If desired, the PVOH bag with the properly selected particle size may be dissolved in a pail and pumped through the stem assembly. Placing a bag(s) in the tire cavity eliminates the time consuming pumping procedure and costly equipment, required to pump liquids through the stem assembly.
4. The use of a dry powder material or liquid may be applied via the invention delivery system eliminating previous concerns of limited shelf life associated with the use of high-viscosity tire sealant solutions. The water-soluble bag may be selected to allow application of specific liquids such as a biocide that will not dissolve the PVOH bag. This allows placement of a smaller water-soluble bag inside the larger PVOH bag, which then dissolves after the initial PVOH bag is dissolved.
5. Utilization of dry materials packaged in the water-soluble bag eliminates the need for control of air-borne dust particles making this product the safest and most effective delivery system available to the tire industry.
6. Shipping costs have been reduced to a minimum by shipment of dry bio-friendly materials, eliminating the need to ship water and freeze protection in pails or drums. Some of these earlier solutions are potentially hazardous or unknown materials. Conventional ground shipping methods can be used to easily ship the invention world-wide. Size and weight of packaging has been reduced by 50 to 100% resulting in a dramatic weight, size and cost reduction from most all previous manufacturing methods.
7. The 5-gallon pail which liquid sealant manufacturers are required to use to package their products is no longer a necessity. This reduces cost of manufacturing and weight of the shipment.
8. Propylene glycol can be added after application to the tire. Freeze protection can be applied later in the event equipment is relocated to a colder climate.

Countries around the world located near and around the equator will be able to use this delivery system without the high cost of shipment or content of antifreeze. With ecological concerns becoming more prevalent, use of costly and toxic glycol solutions has become an issue for most all sealant manufacturers.

BRIEF DESCRIPTION OF THE DRAWINGS

The novel features of this invention will be best understood from the accompanying drawings, taken in conjunction with the accompanying description, in which similar characters refer to similar parts, and in which.

WRITTEN DESCRIPTION OF THE PREFERRED EMBODIMENTS

Figure 1:
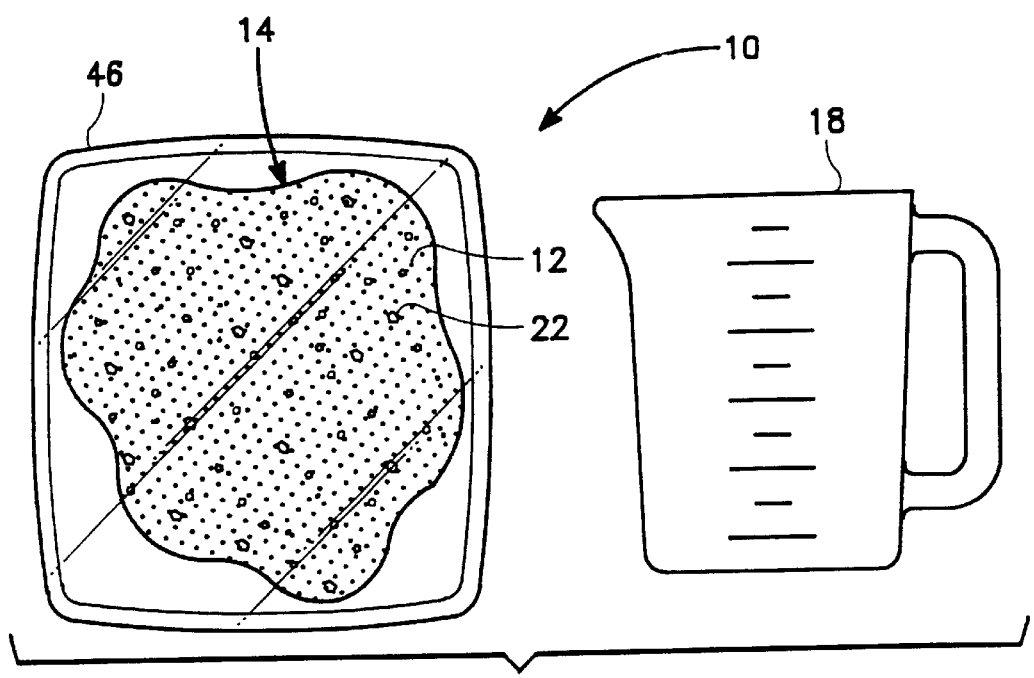
FIG. 1 is a combined elevational view of the water soluble bag hermetically sealed within a wrap, and isometric view of a container holding the predetermined water amount, for the tire sealant system of the present invention.

Referring to the Figures, the tire sealant system of the present invention is shown and is generally designated by reference character 10. The system includes a tire sealant powder 12 which is hermetically enclosed within a bag 14. The bag, in combination with a predetermined amount of liquid 16, preferably water (illustrated in FIGS. 1 and 2 as being contained in a generic container 18), forms an airtight seal on a tire 20 as detailed below.

The powder comprises a plurality of particles 22 (not shown to scale in the Figures) that mix with water to form a low viscosity, aqueous suspension. Specifically, some of the particles are made of a high density hydratable inorganic material such as sodium bentonite, while other particles made of a crystallite barium sulfate material. Still other particles are made of a mica material. The preferred ratios by weight of these particles within the powder can be found in U.S. Pat. No. 5,364,463 which issued to Applicant for an invention entitled "Tire Ballast And Sealant" and which is herein incorporated by reference.

The bag 14 is made of a material that is soluble in water. Preferably, the bag is made of a polyvinyl alcohol (PVOH) polymer. An exemplary bag of this material is manufactured by Chris Craft® Industrial Products, Inc. Other materials which are soluble in water are envisioned to be within the scope of the present invention, provided the powder can be sealed within a bag made of the material. An example of an alternate material is a bag made of a methyl hydroxy propyl cellulose polymer, also manufactured by Chris Craft® Industrial Products, Inc.

If the preferred PVOH bag is used, it should be noted that a biodegradation of the PVOH materials occurs. Biodegradation of PVOH is the process by which microorganisms such as bacteria and molds secrete extra-cellular enzymes that chemically break down the PVOH polymer (prematurely) into smaller molecules. To prevent this process from occurring, a biocide is preferably added to the PVOH polymer. The biocide, however, must be compatible with the powder in the sense that it is inert to the powder and does not prevent the powder from combining with liquid as described above.

As shown in FIG. 1, the bag has a somewhat rectangular shape. Other shapes are envisioned for the bag, such as circular or polygonal shapes, according to manufacturing considerations and consumer aesthetics.

For storage, the water-soluble bags are stored in a secondary packaging 46, as shown in FIG. 1. The packaging must provide an airtight seal around bag 14, to prevent any humidity in the air from prematurely dissolving the bag. Examples of such packaging include, but are not limited to, foil lined cardboard boxes, polymer lined fiber drums, high density polyethylene (HDPE) wraps and low density polyethylene (LDPE) cartons. Preferably, the secondary packaging is a HDPE wrap.

Figure 2:
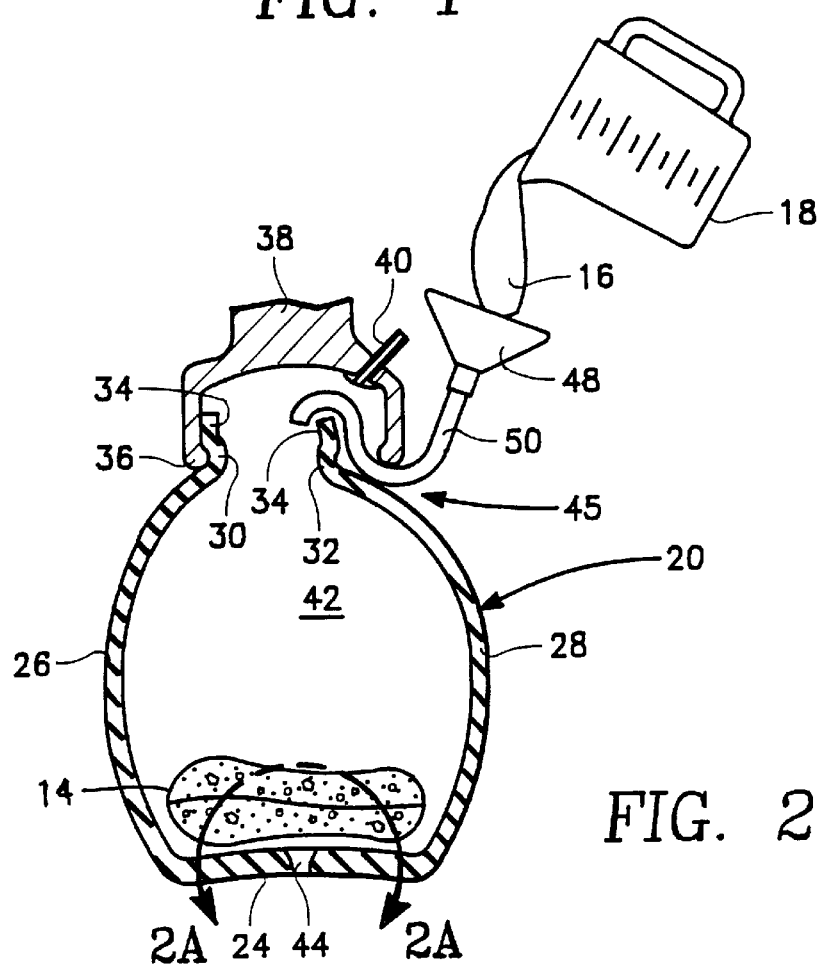
FIG. 2 is a cross-sectional view of the system of FIG. 1 when in an operational environment within a tire well of a tire.
Figure 3A:
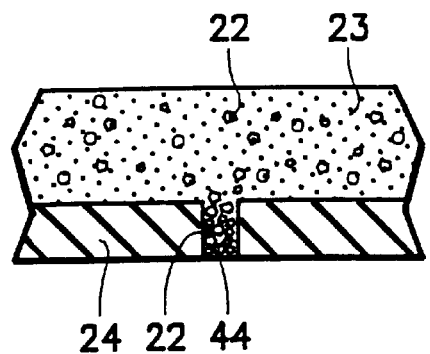
FIG. 3A is an enlarged view taken along line 3A—3A in FIG. 3 which shows the manner in which the sealant system particles seal the tire puncture.
Figure 3:
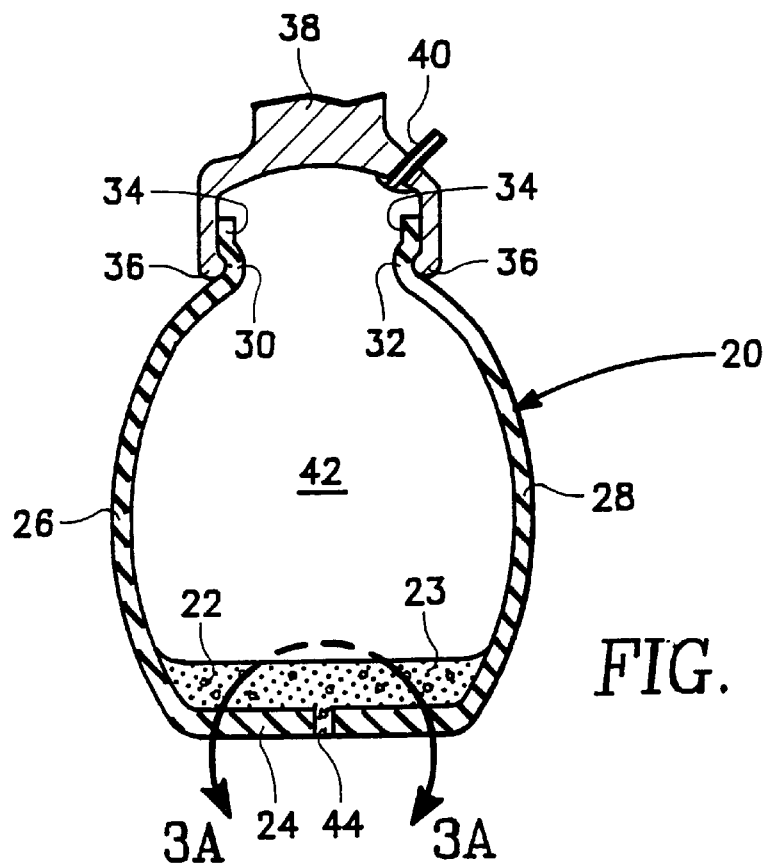
FIG. 3 is the same view as FIG. 2 but with the system fully deployed and with the tire inflated.

Referring to FIGS. 2–3A, the manner of deployment of the tire sealant system of the present invention is more fully described. FIGS. 2 and 3 show a cross-section of tire 20 with a tread 24 which merges into opposing inner sidewall 26 and outer sidewall 28. The inner sidewall terminates at a inner tire bead 30 in a manner known in the art, while outer sidewall terminates at outer tire bead 32. As is also known in the prior art, the inner and outer beads have corresponding mating surfaces 34, 34 for engagement with respective flanges 36, 36 of wheel rim 38 when the tire is mounted to the rim.

A tire stem 40 extends through the rim and into the well 42 of the tire in a manner known in the art. The stem allows for selective inflation/deflation of the tire.

FIGS. 2 and 3A show a puncture 44 extending through the tire tread. The tire sealant system in the present invention is used to seal punctures in the tread with a diameter up to approximately seven sixteenths of an inch (D=7/16"). It is to be appreciated, however, that the sealant system of the present invention can also be used to seal punctures with a diameter up to approximately one sixteenth of an inch (D=1/16") in the side wall in certain situations as described below. The sealant system can further be used to seal intact tires against future punctures using the method to repair a puncture as detailed below.

To repair the puncture, the tire is deflated, if necessary, and outer tire bead 32 is separated from wheel rim 38. This creates a gap 45 between the outer bead and the rim, and the bag (and the powder sealed within the bag) is inserted through the gap and placed in tire well 42. Next, flexible spout 50 of a funnel 48 is inserted into the gap, and the predetermined volume 16 of liquid corresponding to the amount of the powder is poured through the funnel and into the tire well. With the liquid in place within the well, the outer bead is remounted to the wheel rim and the tire is inflated.

Figure 2A:
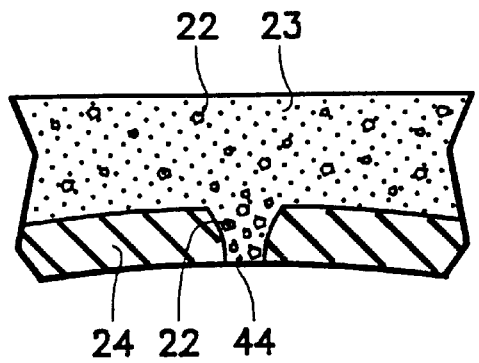
FIG. 2A is an enlarged view taken along line 2A—2A in FIG. 2, but with the bag of FIG. 2 dissolved, which shows particles from the sealant system being deposited in the tire puncture.

As the liquid contacts bag 14, the bag dissolves into the liquid. Once this occurs, the powder within the bag contacts the liquid and forms an aqueous suspension 23. Particles from the suspension deposit within the puncture, as best seen in FIG. 2A.

As stated above, the preferred liquid is preferably water. It may be necessary in extreme cold environments (up to minus thirty degrees Fahrenheit, T=−30° F.), to add a bio-friendly antifreeze additive to maintain the fluid properties of the liquid. An exemplary additive is propylene glycol.

As the tire inflates, the tire regains its original shape (shown in FIG. 3) and the shape of the puncture opening changes from a frusto-conical shape (FIG. 2A) to a somewhat cylindrical shape (See FIG. 3A). As this occurs, the particles which have deposited within the puncture seal the puncture. Further, the suspension within the tire well forms an internal seal for the puncture. When the tire is mounted on a vehicle (not shown), rotation of the tire during operation of the vehicle provide a mixing action to assist in maintaining the particles in long-term suspension.

The method for sealing a tire as described above provides several added advantages. Specifically, since only the outer bead of the tire needs to be removed to repair the puncture, the wheel does not have to be removed from the vehicle axle (not shown). This provides a significant advantage for vehicles which are being used at a remote work site or in an off-road capacity. Further, the tire stem does not have to be removed to seal the tire as described above.

If a new tire is being mounted to a wheel rim, the mating surfaces of the inner and outer beads can also be sealed by the system of the present invention. To do this, the sealant powder can be mixed within any container 18 (or any other device for containing a liquid known in the art) to form a suspension as described above. Once the powder and liquid has formed the liquid suspension, the suspension can be applied to the mating surfaces 34, 34 of the inner and outer bead. This can be done in a manner known in the art, for example, with a brush (not shown). Finally, the inner and outer beads are mated with corresponding flanges 36, 36 to mount the tire to the wheel rim. Once the tire is inflated, the system provides a sealing effect between the inner bead and the rim, as well as the outer bead and the rim.

In order for the system of the present invention to seal a puncture in the tread, the system must form a suspension which pools above the puncture in the tire well volume as described above. This completely submerges the puncture below the suspension. For a puncture of a side wall, the pool of suspension must have a depth which is sufficient to completely submerge the portion of the puncture in communication with the tire well. Accordingly, the volume of the suspension varies according to the internal volume of the tire well. Stated differently, the amount of sealant powder, as well as the amount of liquid to be added as described above, is determined by the size of the tire. Preferable amounts are shown below, according to tire sizes which are standard in the tire industry.

| | Ratio Of Powder Weight to Liquid Volume | | |
|---|---|---|---|
| Tire Size | Gallons (Water & Additive) | # Bags | Bag Size (weight of powder in lbs) |
| 13–5 × 6 | 1/2 quart(qt) | 1 | .25 |
| 4.8 × 8.0 | 1 qt | 1 | .5 |
| 8.0 × 16.5 | 2 qts | 2 | .5 |
| 7.5 × 16 | 3 qts | 3 | .5 |

-continued

Ratio Of Powder Weight to Liquid Volume

| Tire Size | Gallons (Water & Additive) | # Bags | Bag Size (weight of powder in lbs) |
|---|---|---|---|
| 10 × 16.5 | 1 gallon(gal) | 1 | 1.5 |
| 11L × 16 | 1 gal | 1 | 1.5 |
| 31–15 × 15 | 1 gal + 2 qts | 1 | 2.2 |
| 12 × 16.5 | 1 gal + 1 qt | 1 | 2.2 |
| 12.5 × 18 | 1 gal + 2 qts | 1 | 2.2 |
| | | 1 | .5 |
| 14 × 17.5 | 1 gal + 3 qts | 1 | 2.2 |
| | | 2 | .5 |
| 15 × 19.5 | 2 gal + 2 qts | 2 | 1.5 |
| 13 × 24 | 3 gal | 2 | 2.2 |
| 14.9 × 24 | 4 gal | 2 | 2.2 |
| 14 × 24 | 4 gal | 2 | 2.2 |
| | | 1 | 1.5 |
| 16.9 × 24 | 4.5 gal | 3 | 2.2 |
| 17.5 × 25 | 5 gal | 3 | 2.2 |
| | | 3 | 5 |
| 16.9 × 30 | 5 gal | 3 | 2.2 |
| | | 1 | 1.5 |
| 20.5 × 25 | 7 gal | 5 | 2.2 |
| 33.5 × 39 | 30 gal | 20 | 2.2 |

It is to be appreciated, however, that the above ratios are not exact and can be modified. In fact, for larger tire sizes, extra liquid and/or sealant powder can be added. The weight of the added liquid and sealant powder is enough (several hundred pounds per tire) so that an added ballast effect is provided by the system of the present invention. This is particularly important when the system is used on tires for heavy construction vehicles, where a low center of gravity for the vehicle is desired.

This unique water-soluble bag delivery system for tire sealant treatment applications provides a means to establish stability of the tire sealant solution within 3 to 5 minutes of applications into the tire cavity. It can be used with tube type tires or tubeless (the PVOH bag can be dissolved in a container and pumped into the tube) and will seal bead area leaks as well as punctures in the tread area. If tube type tires are treated the tube can also be removed and the stem assembly replaced with a tubeless stem assembly. The PVOH bag can also be used to apply additives when the sealant is mixed for ballast applications (55 gal drum).

This invention can be optimally applied to new tires prior to completion of mounting to minimize the cost of removing the tire from the wheel. However, the invention can easily be applied to tires already in use either before or after a flat has been encountered. It is best applied prior to having a flat to avoid vehicle downtime. Application details are listed below:

1. Deflate tire by removing the valve core from the stem assembly. If treating new tires while being mounted apply water-soluble bag and water and antifreeze immediately prior to final bead mounting after the first bead has been seated to rim.
2. When treating a mounted tire separate the bead of the tire from the rim of the wheel.
3. Remove water-soluble bag from outer pouch protecting it from moisture.
4. Drop the water-soluble bag with contents into the tire cavity between the bead of the tire and the wheel rim.
5. Using a funnel apply the recommended amount of liquid (water and antifreeze) for local cold climate extremes to the tire cavity. The user should refer to application information or chart provided by manufacturer of the freeze protection agent, in order to determine the amount of antifreeze required. The liquid may also be mixed in a container and poured between the bead of the fire and the rim if desired (refer to application notes below). Water and antifreeze should be accurately measured and combined prior to application into tire cavity. Water and freeze protection may alternately be applied at any time through the valve stem, if desired.
6. Remount tire to rim.
7. Inflate tire to recommended pressure. A second means of applying this invention to new or used tires is described below.
  1. Deflate tire by removing core from tire stem assembly.
  2. Place water-soluble bag with dry powder and, or, liquid contents, using this invention, into a pail containing the prescribed liquid.
  3. Stir thoroughly for three to five minutes with a paint-stirring utensil. If mixing more than 3 gallons at one time it is recommended a variable drill motor be used in conjunction with a paint mixing apparatus.
  4. Use a conventional tire sealant hand pump to pump solution into the tire cavity.
  5. Replace valve core into tire stem assembly.
  6. Re-inflate fire to recommended tire pressure. The following notations clarify more specific applications when applying this invention.

A. Tube type tires which have a portion of the tube exposed to the environment are not recommend for sealant treatment because the invention may not seal punctures in the tube lining.
B. The invention can also be used to treat tube or tubeless tires with balancing agents.
C. If a tire in use has been punctured by less than 7/16 inch it can often be treated with the invention on-site in place of conventional tire repair by de-beading the tire from the wheel (outside bead). Then drop the water-soluble bag into the tire cavity as noted above, add liquid and inflate tire.
D. A puncture in the tire side-wall smaller than 1/16 inch can often be sealed for limited periods of time, a few days to several weeks. Puncture protection of a tire side-wall will vary depending on the application of the tire, the quality of the tire and thickness of the sidewall.
E. The invention is simple enough that most end-users can treat their own tires as discussed above, yet a tire service agency will find the invention to his advantage, in that, many users will prefer to have a tire repair agency dismount tires to install the sealant material. Once the bag is located in the cavity and both beads are sealed water and freeze protection may be added through the stem assembly if desired.
F. A partially worn tire will have more flat exposure due to the lower height of the tire tread, therefore it is practical to treat any tire with 20% of the tread remaining.
G. The required liquid may also be applied via a hand pump after the tire is mounted. Refer to pumping procedure above regarding pumping through the stem assembly.
H. Application or effectiveness of this invention is not effected by ambient temperature although the viscosity will be somewhat higher in colder climates. The water-soluble bag is limited in use below 32° F. because the bag may crack if handled below freezing conditions. However, no permanent damage to the PVOH bag will occur unless physical shock is applied while being subjected to freezing temperature.

It is best if solution stability (suspension) occurs immediately. Puncture protection is improved because solid particles, which provide fluid-loss-control, are present to be compressed into the tire puncture preventing air pressure leakage. The blending of several chemicals, some of which are hygroscopic, are only effective if supported by the solution rheology, which is maintained by quick dispersal of chemicals via the PVOH bag. The use of buffer chemicals can be quickly and easily applied to create a slightly alkaline solution to insure that clays or other suspension agents will be effective when added to anti-filtration constituents in the formula. Quick dispersal of the various chemicals prevents clotting (fisheye effect) of hygroscopic polymers. Once the water-soluble bag is partially dissolved, application of specific chemicals begin to yield a desired pH or other attribute the mixture may require to create the desired effect as the bag continues to dissolve in water.

The PVOH water-soluble bag delivery system will safely store dry materials for several years. Water-soluble bags produced from polyvinyl acetate or alcohol are available in various forms. The shelf life of the bag is determined by the compatibility of the dry powder materials or liquids being applied to the tire cavity. The water-soluble bag (film) can be selected to best suit the application. This invention allows adjustment of bag sensitivity to alkaline solutions providing pH resistance to organic solvents. This bag thickness may be selected to support payloads of up to 25 pounds. Some bags also provide a degree of suspension quality to the sealant solution by virtue of the chemical contained in the bag formulation. As well, a biocide can be provided by the bag, which will insure bacteria will not contaminate the organic components of the invention or chemical formulation.

The process for filling and sealing the PVOH bag can be accomplished manually or with highly efficient mechanization. Bags are produced from a linear strip or roll of unformed PVOH film of the proper width. Bags may be formed on three sides and cut to the desired length to contain the desired volume of material. The bag is then opened at the top, filled with a scoop of weighed or measured pre-blended powder and heat-sealed with a simple hot-wire sealing device at approximately 300 degrees F. using a 120 volt power source. Bags are then placed in a plastic outer pouch or other protective liner to avoid exposure of the bag to moisture. The outer bag can be made of a plastic zip-lock carrier bag or plastic lined paper composition protecting the PVOH bag from moisture. Once the desired quantity of individual PVOH bags is complete they can be located in the outer barrier layer bag. Thereafter they are boxed and stored in a controlled environment for temporary storage. Storage or facility requirements housing PVOH bags is typical of those in a parts warehouse environment. Care should be taken to maintain 40% to 60% relative humidity when storing bags if possible. Temperature conditions of 73+/−10 degrees ° F. are most ideal for storage. The outer carrier bag helps provide isolation from moisture and effects of temperature on bag stability, but caution is recommended in control of the environmental conditions especially when bags are to be handled.

The present packaging method utilizes approximately four 2 pound water-soluble bags contained in a one-gallon capacity plastic carrier bag to protect the PVOH bags from exposure to moisture. Common tire sizes used in the industry can be treated by selecting an appropriate bag size that may be applied in various multiples to attain accurate treatment. A smaller, 5-LB bag is available to treat smaller tires, which can be used to reapply small amounts of sealant liquid to tires that may be lost when solution is recovered from the tire and reused, or when more propylene glycol must be added.

A positive attribute of the water-soluble bag delivery concept is the adaptability of a delivery system, which offers a variety of bag sizes that can be utilized to treat the growing demand of new tire sizes. This allows easy treatment of the myriad of tire sizes the tire industry is required to make to meet emerging vehicle applications.

By avoiding the pumping procedure, chemicals previously inserted through the stem assembly now may be applied directly into the tire cavity. This provides many more options in solution chemical make-up previously unavailable because of the limited diameter of the stem orifice. This invention also allows abundant options of solids that can be used depending on the desired results. This invention allows application of dry powder to other liquid freeze protection systems, i.e. magnesium chloride, calcium chloride, and salt water. These chemicals may be applied in dry form in a variety of climates making them more cost effective than propylene glycol. Likewise, shipment cost is substantially reduced by elimination of shipment of antifreeze and water. A 2.5-lb. treatment of this invention for off-road use (approx. 1250 ml of dry measure of bio-friendly chemicals) will treat a 12×16.5 size tire. Where as the same tire previously would have required several pounds (5 lbs or more) of conventional sealant solution (one-half gallon to one and one half gallons), depending on the sealant effectiveness and application criteria. This delivery system lends itself to use in both on-road and off-road tire sealant applications when post of shipment, storage, and installation become a significant factor in the application.

While the particular tire sealant system, as herein shown and disclosed in detail, is fully capable of obtaining the objects and providing the advantages above stated, it is to be understood that the presently preferred embodiments are merely illustrative of the invention. As such, no limitations are intended other than as defined in the appended claims.

What is claimed is:

1. A method for sealing a tire comprising the steps of:
   A) providing a tire sealant powder;
   B) hermetically enclosing said powder in a water soluble bag;
   C) placing said bag in the well of said tire; and,
   D) adding a predetermined amount of water to said tire well.

2. The method of claim 1 wherein said tire has a pair of opposing beads for attachment to a wheel rim and, after step D, further comprising the step of:
   E) engaging said beads with said rim.

3. The method of claim 2 wherein said beads have a corresponding mating surface for engagement with said rim, wherein step D establishes an aqueous suspension in said tire and further comprising the step of:
   F) applying said suspension to said mating surface, said applying step to accomplished prior to step E.

4. The method of claim 1 further comprising the step of storing said powder in an airtight container.

5. A method for repairing a puncture in a tire, said tire defining a tire well and having a pair of opposing beads attached to a wheel rim, said method comprising the steps of:
   A) removing one of said beads from said rim;
   B) providing a tire sealant powder;
   C) hermetically enclosing said powder in a water soluble bag;
   D) placing said bag in said tire well;
   E) adding a predetermined amount of water to said tire well; and,
   F) replacing said one bead on said rim.

6. The method of claim 5 further comprising the step of

G) deflating said tire, said deflating step to be accomplished prior to said removing step A.

7. The method of claim 5 wherein said beads have a corresponding mating surface for engagement with said rim, wherein said adding step establishes an aqueous suspension in said tire and further comprising the steps of:

H) detaching the other of said beads from said wheel rim;

I) applying said suspension to said mating surfaces, said applying step to be accomplished prior to said replacing step; and J) remounting said other bead to said rim.

8. The method of claim 5 further comprising the step of:

K) storing said powder in an airtight container.

9. A system for sealing a tire, said tire having a tire well, said system comprising:

a predetermined volume of liquid poured into said tire well;

a tire sealant composition;

a water-soluble bag filled with said sealant composition; and placed in said tire well, said bag dissolving in said liquid when placed therein; and said liquid combining with said sealant composition to form a liquid suspension for sealing said tire once said bag dissolves.

10. The system of claim 9 wherein said liquid suspension further comprises:

fifty to eight percent (50%–80%) liquid;

at least ten weight percent (10%) hydratable, heavy metal inorganic salts and crystalline silicate clays capable of forming a viscous gel, the heavy metal inorganic salts being at least sixty percent (60%) by weight of said salts and clays; and, three to thirty-five percent (3–35%) mica particles which pass through a 40 mesh screen.

11. A system for sealing a tire comprising:

a tire sealant composition;

a water-soluble bag containing an effective amount of said sealant composition; and, a predetermined volume of liquid, said bag dissolving in said liquid to combine said liquid with said sealant composition to form a liquid suspension;

said liquid suspension being fifty to eighty percent (50%–80%) liquid;

said liquid suspension having at least ten weight percent (10%) hydratable, heavy metal inorganic salts and crystalline silicate clays capable of forming a viscous gel, the heavy metal inorganic salts being at least 60% by weight of said salts and clays; and, said liquid suspension including three to thirty-five weight percent (3–35%) mica particles which pass through a 40 mesh screen.

12. The system of claim 11 wherein said sealant composition is hermetically enclosed within said bag.

13. The system of claim 11 wherein said bag is made of a material selected from the group consisting of a polyvinyl alcohol (PVOH) polymer and a methyl hydroxy propyl cellulose polymer.

14. The system of claim 11 further comprising an airtight secondary packaging, said bag being sealed within said packaging for storage.

15. The system of claim 14 wherein said packaging is selected from the group consisting of foil lined cardboard boxes, polymer lined fiber drums, high density polyethylene (HDPE) wraps and low density polyethylene (LDPE) cartons.

16. The system of claim 11 wherein said liquid is water and including an effective amount of an anionic polyelectrolyte thickening agent.

17. The system of claim 11 wherein said liquid is water/propylene glycol combination.

* * * * *